United States Patent [19]
McKee, Jr.

[11] Patent Number: 5,381,000
[45] Date of Patent: Jan. 10, 1995

[54] IMAGE INTENSIFIER WITH MODIFIED ASPECT RATIO

[75] Inventor: William J. McKee, Jr., Palo Alto, Calif.

[73] Assignee: Picker International, Inc., Cleveland, Ohio

[21] Appl. No.: 57,848

[22] Filed: May 7, 1993

[51] Int. Cl.6 .............................................. H01J 40/14
[52] U.S. Cl. ............................... 250/214 VT; 313/526
[58] Field of Search ................ 250/214 VT, 367, 368, 250/370.09, 227.2; 313/524, 530, 526

[56] References Cited

U.S. PATENT DOCUMENTS

| | | | |
|---|---|---|---|
| 3,828,187 | 8/1974 | Winzer | 250/214 VT |
| 4,641,931 | 2/1987 | Loy | 250/214 VT |
| 4,730,107 | 3/1988 | Enck, Jr. et al. | |
| 4,857,724 | 8/1989 | Snoeren | 250/214 VT |
| 4,922,092 | 5/1990 | Rushbrooke et al. | 250/214 VT |
| 4,933,961 | 6/1990 | Rushbrooke et al. | 250/367 |
| 4,994,676 | 2/1991 | Mount | 250/214 VT |
| 5,198,657 | 3/1993 | Trost et al. | 250/214 VT |

OTHER PUBLICATIONS

Schott Fiber Optics Inc. Literature Titled: "Schott Holds the Key"; dated Aug. 1991.
Schott Fiber Optics Inc. Literature Titled "The Big Picture"; dated Jun. 1991.
John J. Cuny, The Development of Proximity Focused X-Ray Intensifier Tubes, Oct. 1988.
Derwent Abstract of PCT patent Application WO 9222073-A1 of Photometrics Ltd. Oct. 1992.
Derwent Abstract of German patent Application DE 3626532-C of Siemens AG. Oct. 1992.

*Primary Examiner*—David C. Nelms
*Assistant Examiner*—K. Shami
*Attorney, Agent, or Firm*—Timothy B. Gurin; Randall A. Notzen

[57] ABSTRACT

An image intensifier 18 is comprised of an evacuated chamber, an input surface 16 having a florescent material thereon for converting incident radiation into a visible light representative of the incident radiation, a photocathode layer 20 disposed closely adjacent the input surface for emitting a cloud of free electrons 22 into the evacuated chamber in proportion to the intensity of visible light at each point thereon, and an output surface 26 having a scintillating material thereon for converting electrons impinging thereon into a relatively bright light image proportional to the electron energy at each point on the output surface said light image having a first aspect ratio. An electrical potential 24 accelerates the free electrons from the photo-cathode to the output surface. A fiber optic bundle 28 comprised of an input face, positioned outside the chamber to view the bright light image at the output surface, and an output face 34 is provided. The output face is terminated at a cut angle 42 other than perpendicular to longitudinal axis immediately before the output face such that the output face is at a second aspect ratio when viewed normal thereto.

22 Claims, 4 Drawing Sheets

IMAGE INTENSIFIER WITH MODIFIED ASPECT RATIO

BACKGROUND OF THE INVENTION

The present invention relates to image intensifier tubes used in the field of imaging or inspection. The present invention finds particular application in conjunction with fluoroscopic imaging systems and will be described with particular reference thereto. However, it should be appreciated that the present invention also finds application in areas wherein images, resulting from the conversion of electromagnetic radiation of a wide range of wavelengths or particulate matter, such as thermal neutron, alpha particles, high energy electron beams or the like, are viewable on a CRT.

One type of conventional fluoroscopic imaging system is comprised of a source of penetrative radiographic energy which propagates a beam of radiation through an object to be imaged. The beam passing through the object is selectively attenuated by internal structures within the object, according to the density of the internal structure, such that the beam exiting the object contains a radiographic representation of the objects internal structure. The input face of an image intensifier tube is disposed in the path of the exiting beam such that the radiation beam containing the radiographic representation impinges thereon. The image intensifier tube converts the radiographic representation into a viewable light image on the output end thereof. The image intensifier tube is comprised of an evacuated tube having a circular input screen and a smaller diameter circular output screen. The input screen is comprised of a fluorescent material, such as cesium iodide. The radiation beam Impinging on the fluorescent material is absorbed thereby and a portion of the absorbed energy Is converted into light. Closely adjacent the florescent material Is a photocathode which absorbs the light emitted by the interaction of the radiation beam and the fluorescent material. The photocathode emits free electrons into the evacuated tube In response to the interaction of the light on the photocathode. The electron density of the free electrons emitted from point-to-point on the photocathode screen corresponds to the intensity of the light reaching the photocathode at each point thereon. An electrical potential is applied between the Input screen and the output screen for accelerating the free electrons towards the output end of the tube where they strike the output screen. A phosphor on the output screen converts the impinging electrons into visible light. While the image at the output face of the intensifier tube is directly viewable it is typically not useable fiber diagnostic viewing because of Its relatively small output diameter.

To overcome this shortcoming, the input side of a video camera tube is optically coupled to the output face of the intensifier tube. The video camera is comprised of an evacuated camera tube and associated electronics. The camera tube and associated electronics convert the viewable light image at the output of the intensifier tube Into a electronic signal equivalent of the viewable light image in a known manner. The electronic signal from the video camera is communicated to a cathode ray tube (CRT) for viewing of the image or to a storage device, for subsequent electronic manipulation thereof by image processing algorithms as are know in the art. The viewable image produced on the CRT from the electronic signal is an enlarged version of the image at the image intensifier output.

Electronic sensor arrays, such as semiconductor charge coupled devices (CCD), have started replacing video camera tubes. These sensors are typically smaller in size, less expensive, consume less power, require less interfacing hardware and tend to have a longer useful life than the video camera tubes they replace. CCD arrays are comprised of a plurality of light receiving elements formed into a array of rows and columns. In operation, the light receiving side of the CCD is placed in close proximity to the image intensifier output such that the entire diameter of the image intensifier output is completely viewable by the CCD array. Each element in the array receives light from a closely adjacent portion of the intensifier tube output screen and converts the light into an electrically equivalent output thereof. At predetermined intervals, control electronics connected between the CCD array and the CRT scan the electrical output of each element in the array in synchronization with the scan of the display on the CRT such that the electrical output of the array elements are reproduced as a viewable image, representative of the image intensifier output.

A number of CCD arrays of varying shape are commercially available. A particularly popular shape for a CCD array is rectangular wherein the width-to-height ratio is 4:3. This aspect ratio is popular because the CRT of commercial television equipment have the same aspect ratio. In this application the entire CCD array is used to view an image which can be reproduced on the television CRT without any aspect ratio conversion. For each shape of CCD array a plurality of light receiving element densities are available to provide choice of image resolution capability to the user. A greater light receiving element density corresponds to a greater resolution of the resultant image being available to the CRT. Generally, as the light receiving element density increases the CCD arrays become more expensive and difficult to obtain. Moreover, CCD arrays having an aspect ratio other than 4:3 are generally less available and thus, more expensive. Accordingly, in fluoroscopic imaging applications, it is desirable to utilize CCD arrays having a 4:3 aspect ratio and having a light receiving element density that corresponds to element densities used with commercial television equipment. One problem with using 4:3 aspect ratio CCD arrays in fluoroscopic imaging is that convention dictates that the circular intensifier output be completely reproduced on the CRT. Using a 4:3 aspect ratio CCD to view the circular output of an image intensifier tube results in a maximum CCD utilization of about 59%, the remaining 41% going unused.

One apparatus that uses more of the viewing capacity of a 4:3 aspect ratio CCD is disclosed in U.S. Pat. No. 4,857,724 to Snoeren and having an issue date of Aug. 15, 1989. The '724 patent discloses an anamorphic lens disposed between the circular intensifier output screen and the 4:3 aspect ratio CCD such that the output image is horizontally stretched in a direction along the longer axis of the CCD to utilize more of the array elements. One problem with stretching the image in this manner is that if this image were directly transferred to a 4:3 aspect ratio CRT the viewable image would be horizontally stretched along its longer axis. However, by simultaneously increasing the horizontal read scan speed of the CCD and synchronizing the start of horizontal read scan of the CCD to the horizontal scan of the CRT output image scan, the resultant viewable image can be converted into an undistorted circular image. In this manner a 4:3 aspect ratio CCD, used in conjunction with a conventional image intensifier tube, can be effectively used to present a conventional circular image on a commercially available CRT.

One problem with this approach is that an anamorphic lens is comprised of a plurality of Individual external optical lenses arranged in optical alignment to change the aspect ratio of the image. Because a plurality of lenses are required this approach is optically inefficient thereby causing a corresponding decrease in the overall efficiency of the system. Accordingly, a higher does rate is required to obtain the image contrast necessary for diagnostic imaging. Moreover, the prior approach results in the size of system being rather large, with an optical length being over 170 mm.

The present invention provides a new and improved way to present a 4:3 aspect ratio image to a 4:3 aspect ratio CCD input while avoiding the need to place an anamorphic lens between the image intensifier output screen and the video camera input screen.

SUMMARY OF THE INVENTION

In accordance with the preferred embodiment of the present invention an imaging system comprising an input surface and an output surface is provided. Radiation incident on the input surface is converted into a visible light image on the output surface. The visible light image on the output surface has a first aspect ratio. A light transmission means, having an input face and an output face, is positioned such that the input face views the visible light image on the output surface. The light transmission means has an output face that is oriented at an angle other than perpendicular to a longitudinal axis of the light transmission means at the point where the longitudinal axis intersects the output face thereby providing a view of the transmitted image at a second aspect ratio that is a function of the angle between the central portion of the output face and the longitudinal axis of the light transmission means immediately preceding the output face. A Charge Coupled Device (CCD) is positioned to view the image at the output face. An advantage of this aspect of the invention is that the aspect ratio of the light image can be modified to correspond to the aspect ratio of the CCD.

In accordance with a more limited aspect of the preferred embodiment, the light transmission means includes means to modify the size of the visible light image between its input face and output face. An advantage to this aspect of the invention is that the size of the image can be modified to correspond to the size of the CCD.

In accordance with another more limited aspect of the preferred embodiment, the output face is one of a planar or curved surface such as a Petzval surface. An advantage to this aspect of the invention is that the image focus on the output face can be modified.

In accordance with even a more limited aspect of the preferred embodiment, the light transmission means is selected from the group consisting of a fiber optic bundle and a lexan cylinder.

In accordance with a another embodiment of the present invention, means for converting incident radiation into a first visible light image having a first aspect ratio and a light transmission means having an input face and output face are provided. The input face is optically aligned with the radiation converting means for receiving the first visible light image. The light transmission means transmits the first light image to the output face. The light transmission means converts the first visible light image into a second visible light image having a second aspect ratio at the output face. A photo cathode optically aligned with the output face converts the second aspect ratio visible light image into an electron cluster representative thereof. An means for accelerating the electron cluster to an output surface is provided. The output surface is comprised of a means for converting electrons impinging thereon into a third visible light. An advantage to this embodiment is that the electron steering components found in conventional image intensifiers can be simplified or eliminated because the output face is approximately the same size as the output surface of the intensifier, thus little or no convergence of the electrons is required to produce the final image.

In accordance with another aspect of this embodiment the radiation converting means is disposed on the input face of the light transmission means.

In accordance with another aspect of this embodiment the photo cathode is disposed on the input face of the light transmission means.

In accordance with a more limited aspect of this embodiment, an evacuated chamber encases the electron emitting side of the photo cathode and the electron impinging side of the output surface. An advantage to this embodiment is that the size of the evacuated chamber is reduced over previous embodiments.

In accordance with another aspect of the invention the input face side of the light transmission means is comprised of the radiation converting means.

In accordance with a more limited aspect of the invention the light transmission means is comprised of a plurality of fiber optic elements.

In accordance with another more limited aspect of the invention the input face side of the light transmission means is tapered such that the longitudinal axis of each element at the input face side of the light transmission means are radially aligned to an imaginary point in front of the input face.

In accordance with yet another more limited aspect of the invention the light transmission means is further comprised of a means for diminishing the propagation of radiation.

In accordance with a still another embodiment of the present invention. A light transmission means comprised of a plurality of fiber optic elements formed into a bundle is provided. The bundle has an input face and an output face. The elements of the bundle are comprised of a scintillating material on the input face end thereof. The light transmission means converts incident radiation into a first visible light image having a first aspect ratio and transmits the first image to the output face wherein the first image is displayed as a second visible light image having a second aspect ratio.

In accordance with a more limited aspect of this embodiment, the light transmission means includes means to reduce the size of the visible light image between the input face and the output face wherein the increase in brightness between the larger input face and smaller output face is a function of the image size reduction between the input face and the output face.

Still other advantages will become apparent upon reading and understanding the following detailed description.

BRIEF DESCRIPTION OF THE DRAWINGS

FIG. 2 (a) illustrates the image intensifier and a fiber optic bundle of FIG. 1.

FIG. 2 (b)-2(c) is a blow-up frustration of the fiber optic bundle of 2 (a).

DETAILED DESCRIPTION OF THE PREFERRED EMBODIMENT

Figure 1:
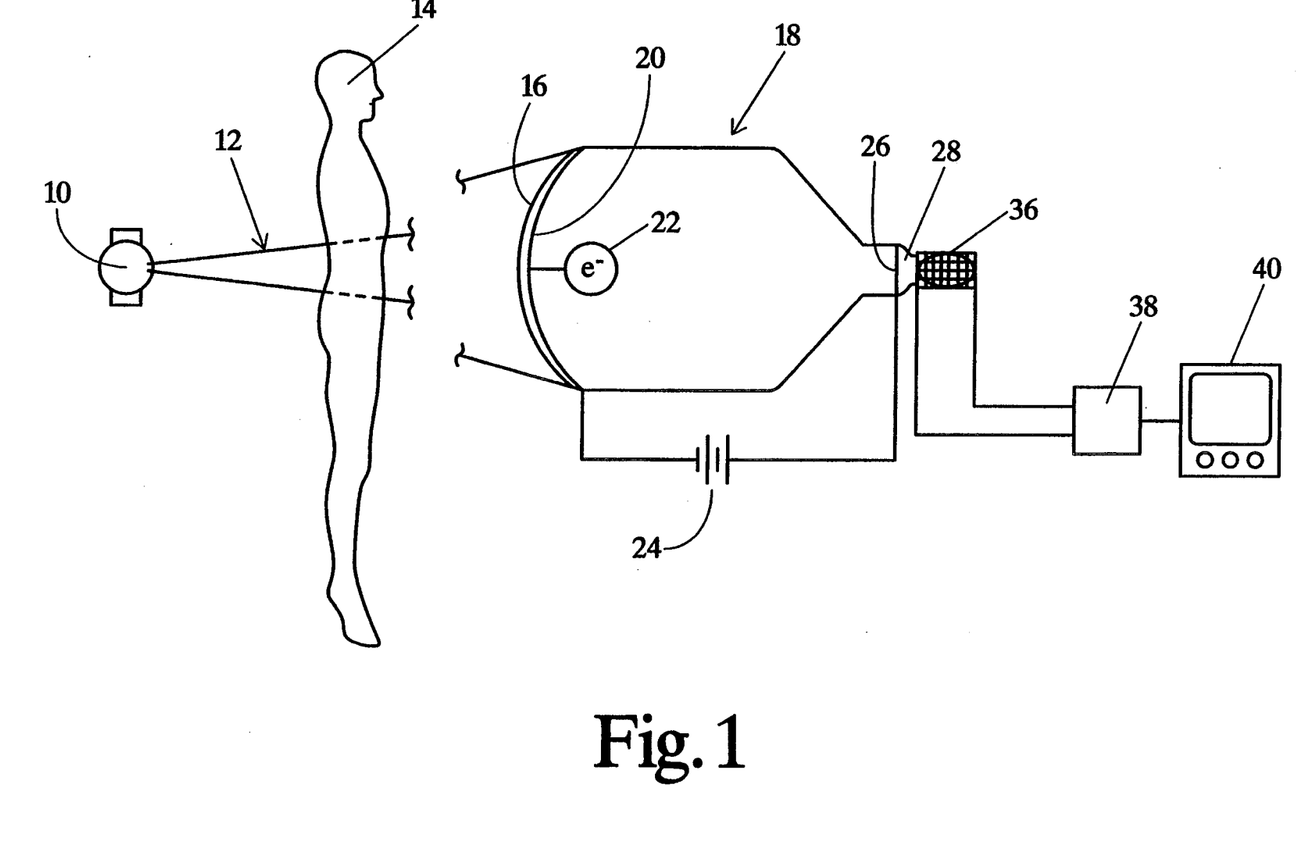
FIG. 1 illustrates a portion of a radiation imaging system according to the preferred embodiment of the present invention.

With reference to FIG. 1, an x-ray tube 10 propagates a beam of radiation 12 through an object to be imaged 14, such as a human patient, and onto an input surface 16 of an evacuated image intensifier tube 18. The image intensifier tube is comprised of an circular input surface, and smaller diameter circular output surface with a tapered tubular body therebetween. The image intensifier input surface has a fluorescent material disposed on the x-ray tube side of the input surface 16. The fluorescent material on the input face emits light in response to x-radiation 12 impinging thereon. The intensity of the light emitted by the fluorescent material corresponds to the intensity of the radiation at each point throughout the radiation beam. A photo cathode 20 is disposed closely adjacent the input surface 16 on the evacuated side of the input screen. The light emitted from the fluorescent material on the input surface strikes the photo cathode layer 20 which in response releases free electrons 22 into the evacuated portion of the image intensifier tube. The electron density of the free electrons emitted by the photo cathode is proportional to the intensity of light reaching each point thereon. An electrical potential 24 is applied between the photo cathode and intensifier output surface, for accelerating the free electrons 22 towards the intensifier output surface. A plurality of steering electrodes are disposed within the chamber for steering the electrons such that they converge and strike the output screen 26. A scintillating material, disposed on the output screen, adsorbs the electrons kinetic energy and converts the same into light corresponding in intensity to the amount of kinetic energy contained in each electron. The sum of the individual light scintillations on the output screen form a visible light image representative of the internal structures of the imaged object 14.

Figure 2:
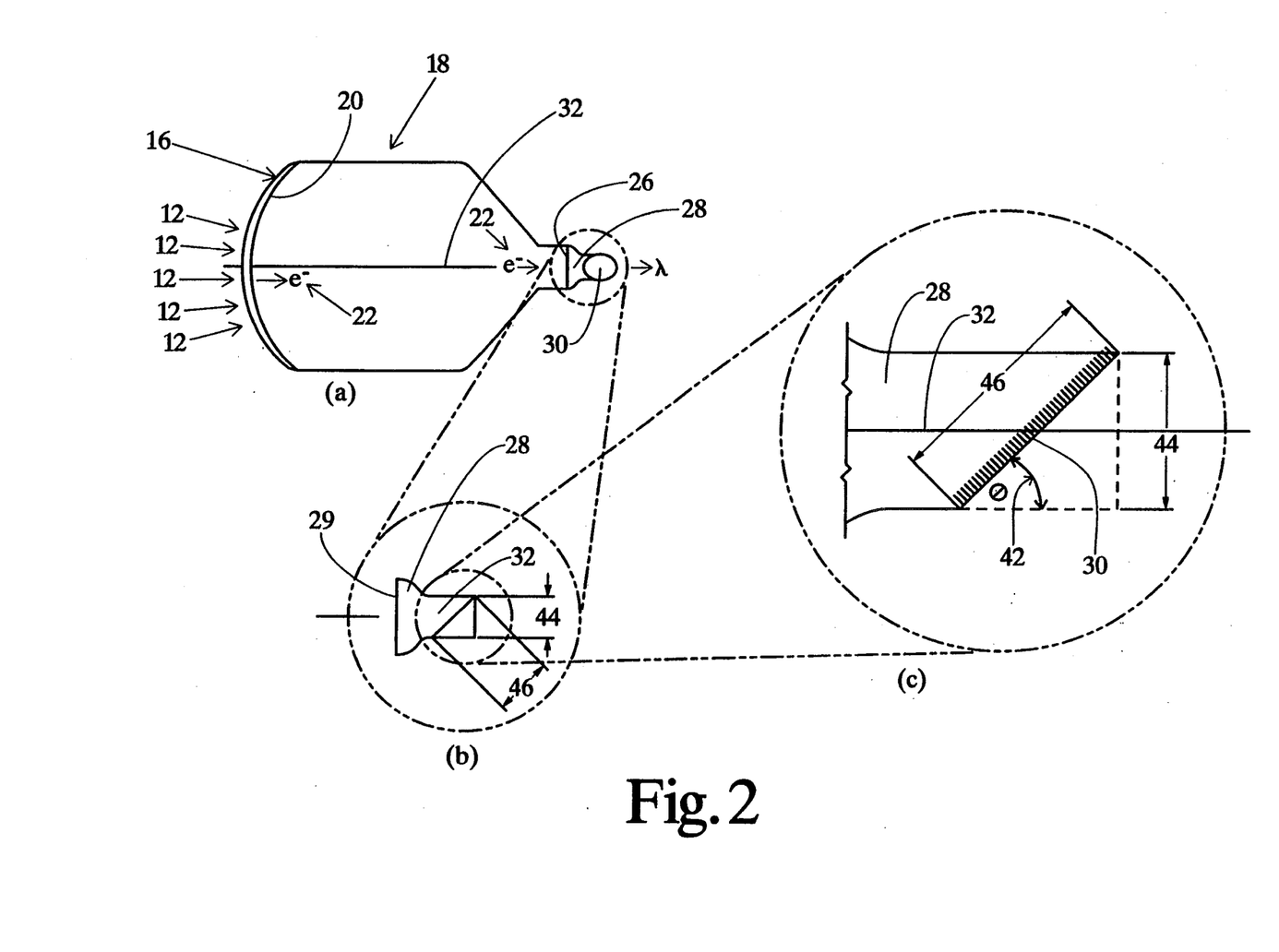

With reference to FIGS. 2(a)-(c), and continuing reference to FIG. 1, a tubular, fused glass, fiber optic bundle 28 comprised of a plurality of individual fiber optic strands is provided. Schott Fiber Optics Inc. of Southbridge, Mass., among others, manufacturers various types and configurations of fiber optic strands. The bundle has an input face 29 and a output face 30. The input face 29 of the bundle 28 is a circular surface when viewed along the longitudinal axis 32 of the bundle. In this embodiment the longitudinal axis of the intensifier tube and the bundle coincide however this is not a requirement of the present invention. The input face 29 of the fiber optic bundle 28 is disposed closely adjacent and parallel to the intensifier tube output surface 26 to receive the light therefrom. In operation the input face 29 of the fiber optic bundle 28 receives light from the output surface 26 and directs/transmits the light to its output face 30. The fiber optic bundle output face 30 is created by cutting the output end of the bundle at an angle other than perpendicular to the longitudinal axis 32 at the point where the longitudinal axis 32 intersects the output face 30. In this fashion the output face 30 and the corresponding image viewable thereat is ellipsoid shaped when viewed in a direction normal thereto. In practice the ellipsoid shaped output face is typically oriented to the output surface of the image intensifier such that the height of the intensifier output image is the short axis of the fiber optic output face. In addition to the above mentioned cut, the bundle output face may be planar or curved into any one of a number of curved surface, such as a Petzval surface wherein the image is in focus at each point along the surface, depending on the optical requirements of the system.

A rectangular CCD array 36 having an aspect ratio corresponding to the aspect ratio of the ellipsoid output face is operatively positioned closely adjacent and parallel to the output face 34 to receive the light therefrom. Each CCD array element that is adjacent a portion of the fiber optic bundle output face 30 receives light output from the corresponding fiber optic bundle and integrates the same thereby converting the light into an electrical charge corresponding to the amount of light received over a period of time. A controller 38 is connected the CCD 36 for reading the electrical charge equivalent of the light received by each CCD array element. The controller is also connect to a CRT 40. The controller reads the charge in each element in the CCD array and transfers the same to the CRT 40 wherein a steerable electron beam scans the pixel elements of the CRT. In synchronization with the reading of the CCD, to produce a viewable image corresponding to the integrated light image viewable by the CCD. After reading each CCD array element the controller 38 resets the charge in each element such that the element can begin integrating the light received from a closely adjacent fiber optic element anew. In fiuoroscopic imaging the controller 38 scans the CCD array and synchronously transfers the electrical charge equivalent to the CRT at select intervals. In this manner the image on the output of the CRT is a updated on a regular basis with a more recent version of the image viewable on the output of the fiber optic bundle. The integrated electrical charge of each element in the CCD array corresponds to a grey scale value in a corresponding CRT pixel element. For example, a large charge corresponds to a relatively bright spot on the CRT and a small charge corresponds to a dark spot on the CRT. Values between the large and small charge values correspond to shades between the bright and the dark spots.

By stretching the intensifier output image horizontally by the use of a fiber optic bundle more elements of the rectangular CCD are used. However, unless the CCD viewed image is compressed the image appearing on the CRT is stretched accordingly. To overcome this problem the horizontal scan rate of the CCD is increased such that reading all of the elements along a row of the CCD occurs in less time than is required for the electron beam in the CRT to complete one horizontal row scan. In this manner the horizontally stretched image is electronically compressed along the horizontally axis. In addition to adjusting the horizontal scan rate the start of each horizontal scan of the CCD and CRT are synchronized with respect to each other such that the resultant image on the CRT appears circular as though no stretching of the image had occurred.

Figures 3, 5:
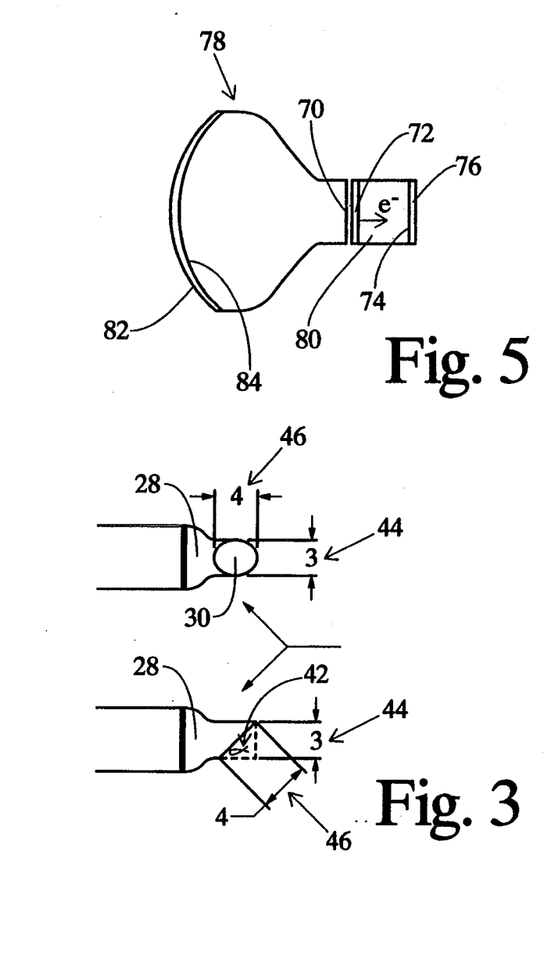
FIG. 3 illustrates a specific embodiment of the fiber optic bundle of FIG. 2(b)-2(c).
FIG. 5 illustrates an image intensifier and fiber optic bundle in accordance with another alternate embodiment of the present invention.

With reference to FIG. 3, in the first embodiment, the output end of the fiber optic bundle is terminated at an angle such that the aspect ratio of the output face ellipsoid corresponds to the aspect ratio of the associated CCD array. In this manner the CCD element usage is maximized. By way of example and not of limitation, to determine the appropriate cut angle 42 such that the resultant aspect ratio is x:y; the $\sin^{-1}$ (y/x) is determined where 'y' corresponds to the length of the short axis of the second aspect ratio and 'x' corresponds to the length of the long axis of the second aspect ratio. If the above equation is solved for an aspect ratio of 4:3 its can be seen that a cut angle 42 of 48.59° to the longitudinal axis 32 immediately preceding the output face results in an aspect ratio of 4:3.

In FIGS. 2(a)–(c) and 3 the fiber optic bundle was illustrated as having an output face that is smaller than the input face however, it should be appreciated that fiber optic bundles wherein the input face and output face have a similar diameters or wherein the input face is smaller than the output face are also contemplated. In the preferred embodiment the light received at the input face of the bundle is viewed at a smaller output lace. This size reduction results in the light received by the input lace concentrating into a smaller area at the output face. Accordingly, if the fiber optic transmission losses are less than the gain resulting from the size reductions, the image at the output face has a greater intensity than the light image at the input face.

Figure 4:
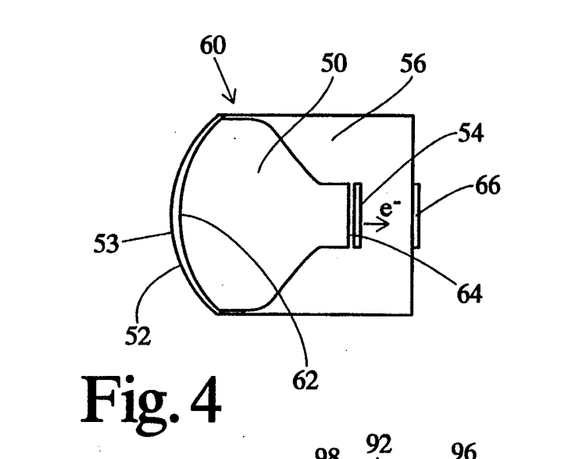
FIG. 4 illustrates an image intensifier and fiber optic bundle in accordance with an alternate embodiment of the present invention.

With reference to FIG. 4, in an alternate embodiment of the invention, an image intensifier 60 comprised of a circular input screen 53, a smaller diameter circular output screen 66 and a tubular body therebetween is provided. The input screen, output screen and tubular body form an evacuated chamber. The input surface has a fluorescent material 52 disposed on the face thereof. A photo cathode layer 54 is disposed in the evacuated chamber 56 between the input screen and output screen. A fiber optic bundle 50 is disposed between the input screen 53 and the photo cathode. In this embodiment the input face of the fiber optic bundle 62 is placed closely adjacent and parallel to the input screen of the image intensifier on which the scintillating material is deposited and the output face of the bundle 64 is placed closely adjacent and parallel to the photo cathode layer 54. The electron cloud created by the interaction of light on the photo cathode 54 is accelerated to the output face 66 by an electrical potential (not shown) applied between the photo cathode 54 and the output face 66. An advantage to this embodiment is that the electron steering components found in conventional image intensifiers, that cause the electrons to converge on the output face, can be simplified or eliminated because the output face of the bundle is approximately the size of the output surface of the intensifier, thus little or no convergence of the electrons is required to produce the final image.

With reference to FIG. 5, in yet another embodiment, the evacuated chamber 80 encloses the electron emitting side of the photo cathode 72 and the electron impinging side of the intensifier output surface 76. Accordingly, the intensifier input surface 82 and the fiber optic bundle body are exposed to atmospheric pressure. As with the FIG. 4 embodiment the fiber optic input face 84 is placed closely adjacent and parallel the input surface of the 82 of the intensifier. An advantage of this embodiment resides in the reduced size of the evacuated portion of the intensifier assembly.

In an extension of either of the FIG. 4 and 5 embodiments the scintillating material is deposited on the input face of the fiber optic bundle and/or the photo cathode material is deposited directly on the output lace the fiber optic bundle. An advantage of this extension resides in the elimination of one or more of a separate intensifier input surface and a separate surface for the photo cathode material.

Figure 6:
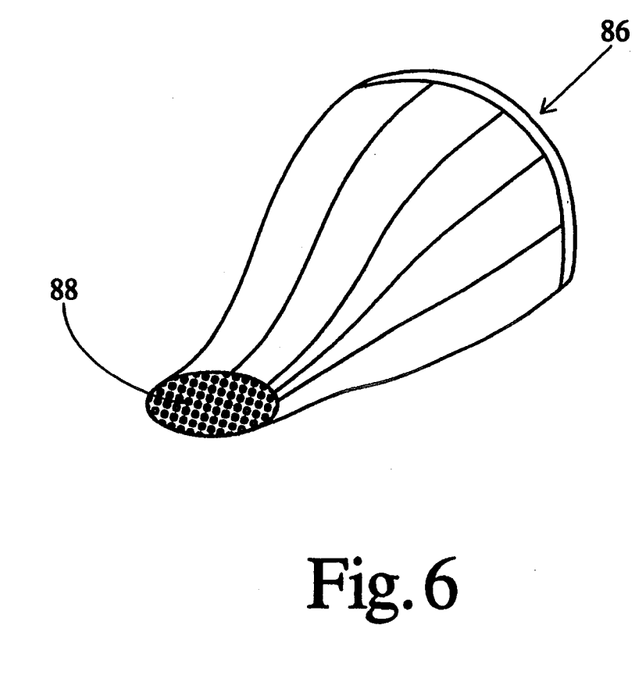
FIG. 6 illustrates an optional fiber optic bundle construction for modifying the aspect ratio in accordance with the embodiments illustrated in FIGS. 4 and 5.

In the preferred embodiment the aspect ratio was modified by cutting the output portion of the fiber optic bundle at a predetermined angle to the longitudinal axis of the bundle. This aspect ratio modifying technique used in conjunction with the embodiments of FIGS. 4 or 5 results in placement of the photo cathode and output surface of the image intensifier normal to the output face of the bundle, and thus off axis to the longitudinal axis of the bundle, thereby resulting in the electrons being accelerated at an angle off axis to the longitudinal axis of the bundle. This sort of image intensifier construction may not be suitable for replacement applications or for applications requiring the output surface to be in line with the longitudinal axis of the bundle. In this case a fiber optic bundle constructed in the manner illustrated in FIG. 6 is used. In FIG. 6, the fiber optic bundle is constructed such that the input face 86 is circular. Extending along the longitudinal axis of the bundle, the body of the bundle gradually tapers into a smaller output face 88 and is formed in the shape of an ellipsoid. In this manner an aspect ratio corresponding to the aspect ratio of the corresponding CCD is formed along the longitudinal axis of the bundle without the need to cut the bundle as with the FIGS. 2 and 3 embodiment.

In a conventional image intensifier most of the light amplification results from the acceleration of electrons to the output screen. However, some of the amplification also results from the convergence of the electrons from a larger input face to a smaller output face. Analogously, light converging from a large diameter input face to a smaller diameter output face also increases in intensity as a function of the ratio of the input diameter to the output diameter. Thus, for example, if the input screen were 25 centimeters in diameter and the output screen were 5 centimeter in diameter the resultant light amplification would be approximately 5 times. In an extension of the FIG. 5 embodiment the evacuated chamber, the photo cathode and the corresponding output surface are eliminated and photo cathode material is deposited directly on the output face of the bundle. Use of this embodiment allows for the conversion of incident radiation into visible light and a moderate amount of light amplification without the need for converting the input light image into an electron cloud and thereafter accelerate the cloud to the intensifier output screen. Because the light amplification in this embodiment is relatively limited compared to the amplification available in a conventional image intensifier it finds particular application where high power x-ray sources, or the like, are used.

Figure 7:
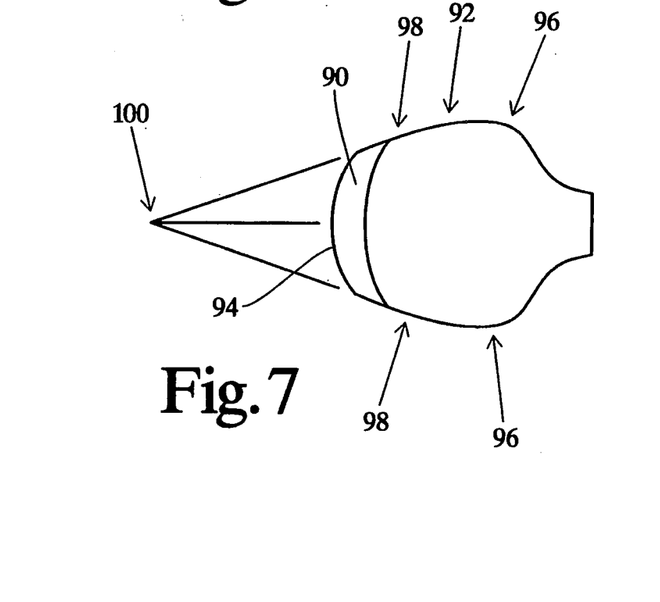
FIG. 7 illustrates an image intensifier and fiber optic bundle in accordance with yet another alternate embodiment.

With reference to FIG. 7, in still another embodiment, the input side 90 of each fiber optic strand in the fiber optic bundle 92 is comprised of a scintillating material. Scintillating fiber optic bundles appear in an article by John J. Cuny appearing in Vol 2 of Electronic Imaging, October 1988, pages 637-642 which is incorporated herein by reference. The use of scintillating fiber optic elements on the input face end of the bundle provides for direct conversion of incident radiation into a visible light image thereby avoiding the need for a separate scintillating surface or having to deposit a separate scintillating material on the bundle input face 94. In this embodiment the input face end of the fiber optic bundle is tapered 98 towards a point source of radiation 100 and the fiber optic elements comprising the bundle are radially aligned to a common focal point. In application the source of radiation is located at the focal point of the elements. By locating the source of radiation at the focal point of the elements a phenomena known as fiber optic crosstalk is minimized. Fiber optic crosstalk results from the combination of a first light image created by the interaction of a scintillating fiber with radiation entering the input face of the fiber optic element, a true light image, and a second light image created by the interaction of the same scintillating fiber with radiation entering the side of the fiber wall, a false light image. The sum of the true light image and false light image results in a light image that contains components of the true and false light images. False light images contribute destructively to the image resolution and therefore are undesirable. In the FIG. 7 embodiment the scintillating portion 90 of the bundle is along the input side of the bundle wherein the fiber optic elements are radially aligned therefore, occurrences of false light images are minimized.

It should be appreciated that a scintillating fiber optic bundle could be used in the embodiments illustrated in FIGS. 4 and 5. Moreover, tapering the scintillating fiber optic bundle such that the fiber optic elements are radially aligned to the source of radiation is also contemplated in the FIGS. 4 and 5 embodiments. In another aspect of the FIG. 7 embodiment, the fiber optic bundle is comprised of a leaded scintillating fiber optic elements that stops or diminishes the propagation of radiation substantially simultaneously with the conversion of the radiation into visible light. Again, the use of a leaded scintillating fiber optic bundles is contemplated for use with the embodiments illustrated in FIGS. 4 and 5. As with previous embodiments, the fiber optic element in the FIG. 7 embodiment is shaped or cut in one or more of the above described manners such that the image aspect ratio at the output face corresponds to the aspect ratio of the corresponding CCD.

In the above description a fiber optic bundle was portrayed as the sole light transmission means, however, other types of light transmission means that channel light in the same manner as a fiber optic bundle, may also be used in one or more of the above embodiments. An example of another light transmission means includes optically transparent plastics such as Lexan TM.

The above invention has been described with reference to the preferred embodiments. Obvious modifications and combinations will occur to others upon reading and understanding the preceding description. It is intended that the invention be construed as including all such modifications, combinations and alterations insofar as they come within the scope of the appended claims or the equivalents hereof.

Having described the preferred embodiment the invention is now claimed to be:

1. An imaging system comprised of:
   means for converting radial on Incident on an input surface into a first visible light image on an output surface, said first visible light image having a first aspect ratio;
   a fiber optic bundle having an input face, an output face and a longitudinal axis along a central portion therethrough, said input face optically coupled to the radiation convening means output surface for receiving the first visible light image, said bundle transmitting said received image to said output face, said output face oriented at an angle to the longitudinal axis other than perpendicular thereto for displaying the transmitted image at a second aspect ratio different from the first aspect ratio, said second aspect ratio related to the angle of orientation of the output face relative to the longitudinal axis.

2. The imaging system as set forth in claim 1 wherein the output face is ellipsoid shaped when viewed normal thereto.

3. The imaging system as set forth in claim 1 further including a charge coupled device positioned closely adjacent to the output face to receive the light therefrom and having an aspect ratio corresponding to the aspect ratio of the output face.

4. The imaging system as set forth in claim 1 wherein said bundle further includes means to modify the size of the visible light image between the input face and the output face.

5. The imaging system as set forth in claim 2 wherein the output face of the bundle is planar.

6. The imaging system as set forth in claim 2 wherein the output face of the bundle is curved.

7. The imaging system as set forth in claim 6 wherein said output lace is in the shape of a Petzval surface.

8. The imaging system as set forth in claim 1 wherein the output face is oriented at an angle of $\sin^{-1}(y/x)$ degrees to the longitudinal axis, where 'y' corresponds to the length of the output face and 'x' corresponds to the width of the output face.

9. An imaging system comprised of:
   means for converting incident radiation into a visible light image comprising, a first surface for receiving incident radiation and a second surface for presenting the light image;
   a plurality of fiber optic elements formed into a bundle having a first end, a second end and a longitudinal axis extending therebetween, said first end cut at an angle generally perpendicular to the longitudinal axis to form a first face, said second end cut at an angle other than generally perpendicular to the longitudinal axis to form a second face,
   one of said first and second face optically coupled with the second surface to receive the light image therefrom, the other of said first and second face displaying the light image at an aspect ratio different than the received image wherein said difference in aspect ratio is related to the cut angle at the second end; and
   a charge coupled device optically coupled to the face of the bundle displaying the light image for viewing the displayed image.

10. The imaging system as set forth in claim 9 wherein the means for converting incident radiation into a first visible light image is disposed on the input face of the light transmission means.

11. The imaging system as set forth in claim 9 further including:
a photo cathode means disposed between the face of the bundle displaying the light image and the charge coupled device and optically coupled with the face of the bundle displaying the light image for converting the displayed image into an electron cloud representative thereof:
an output surface disposed between said photo cathode means and said charge coupled device, said output surface having means for converting electrons impinging thereon into another visible light image, said output surface optically coupled to said charge coupled device; and
means for accelerating the electron cloud from the photo cathode to the output surface along a path.

12. The imaging system as set forth in claim 11 wherein the photo cathode means is disposed on the face of the bundle displaying the light image.

13. The imaging system as set forth in claim 11 further including an evacuated chamber encasing at least the electron emitting side of the photo cathode and the electron impinging side of the output surface.

14. The imaging system as set forth in claim 9 wherein the charge coupled device has an aspect ratio corresponding to the aspect ratio of the face of the bundle displaying the light image.

15. The imaging system as set forth in claim 9 wherein the face of the bundle optically coupled with the second surface of the radiation converting means is tapered such that the longitudinal axis of each fiber optic element forming said face are radially aligned to a focal point of the elements.

16. The imaging system as set forth in claim 9 further comprising a means for diminishing the propagation of radiation.

17. An imaging system comprised of:
a plurality of fiber optic elements formed into a fiber optic bundle having a first end, a second end and a longitudinal axis extending therebetween, said first end, a angle perpendicular to the longitudinal axis thereby forming a first face, said second end cut at an angle other than perpendicular to the longitudinal axis hereby forming a second face
a scintillating means for converting radiation incident thereon into a visible light image having a first aspect ratio, said scintillating means optically coupled to one of said bundle faces such that the one of said faces receives the visible light image, said bundle transmitting the received image to the other of said faces for display at a second aspect ratio, said difference in the first and second aspect ratio related to the cut angle at the second end.

18. The imaging system as set forth in claim 17 wherein the one of said bundles faces is comprised of the scintillating means.

19. The imaging system as set forth in claim 17 further including a charge coupled device optically coupled to the second aspect ratio image and having an aspect ratio corresponding to the second aspect ratio.

20. The imaging system as set forth in claim 19 further including:
a photo cathode disposed between the face displaying the second aspect ratio image and the charge coupled device for converting said image into an electron cloud representative thereof;
an output surface disposed between the photo cathode and the charge coupled device, said output surface comprised of means for converting electrons impinging thereon into visible light, said output surface optically coupled to the charge coupled device;
and means fiber accelerating said electron cloud to said output surface such that said electron cloud impinges on said output surface.

21. The imaging system as set forth in claim 17 wherein the fiber optic elements at the face optically coupled to be scintillating means are tapered such that the longitudinal axis of each element are radially aligned to a focal point of the elements.

22. The imaging system as set forth in claim 17 wherein the fiber optic bundle is further comprised of a material for diminishing the propagation of radiation.

* * * * *